United States Patent
Macker et al.

(10) Patent No.: US 11,915,302 B2
(45) Date of Patent: *Feb. 27, 2024

(54) METHOD, SYSTEM, AND MEDIUM FOR AUTOMATIC DISPLAY OF PRODUCTS VIEWED ON DISTINCT WEB DOMAINS

(71) Applicant: Dealer Dot Com, Burlington, VT (US)

(72) Inventors: Jai Paul Macker, Burlington, VT (US); Chris Scott, Williston, VT (US); Robert Anthony George, Essex Junction, VT (US); Joseph James Pistell, Brewerton, NY (US)

(73) Assignee: Dealer Dot Com, Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,351

(22) Filed: Dec. 10, 2021

(65) Prior Publication Data

US 2022/0101412 A1    Mar. 31, 2022

Related U.S. Application Data

(63) Continuation of application No. 15/216,743, filed on Jul. 22, 2016, now Pat. No. 11,227,324, which is a
(Continued)

(51) Int. Cl.
*G06Q 30/0601* (2023.01)
*G06F 16/9535* (2019.01)
(Continued)

(52) U.S. Cl.
CPC ....... *G06Q 30/0633* (2013.01); *G06F 3/0482* (2013.01); *G06F 16/958* (2019.01);
(Continued)

(58) Field of Classification Search
CPC ............ G06Q 30/0633; G06Q 30/0601–0645; H04L 67/01; H04L 67/53; H04L 67/02; G06F 3/0482
(Continued)

(56) References Cited

U.S. PATENT DOCUMENTS 7,505,913 B2 * 3/2009 Tobin ................. G06Q 30/0239
                                                   705/14.39
7,966,334 B1 * 6/2011 Bezos .................... G06Q 30/06
                                                    707/748
(Continued)

OTHER PUBLICATIONS

Richard Trenholm, Amazon's universal wish list lets you add products from any site, CNET, Apr. 28, 2010 (Year: 2010).*

*Primary Examiner* — Marissa Thein
*Assistant Examiner* — Anna Mae Mitros
(74) *Attorney, Agent, or Firm* — Eversheds Sutherland (US) LLP

(57) ABSTRACT

A method of accumulating a personalized list of products viewed by a user on different website domains includes providing a first embedded code on a first website domain and a second embedded code on a second website domain in which the first website domain is different from said second website domain. Each of the embedded codes allows a specified third party server to communicate interactively with the user. The method further includes automatically accumulating a personalized list of products viewed by the user in a database on the specified third party server, wherein the personalized list includes at least a first product and a second product, wherein the first product is on the first website domain and the second product is on the second website domain.

13 Claims, 12 Drawing Sheets

Related U.S. Application Data continuation of application No. PCT/US2015/012724, filed on Jan. 23, 2015, which is a continuation of application No. 61/931,542, filed on Jan. 24, 2014.

(51) Int. Cl.

| | | |
|---|---|---|
| *G06F 16/958* | (2019.01) | |
| *G06F 40/197* | (2020.01) | |
| *H04L 67/00* | (2022.01) | |
| *H04L 67/53* | (2022.01) | |
| *G06F 3/0482* | (2013.01) | |
| *H04L 67/02* | (2022.01) | |
| *H04L 67/01* | (2022.01) | |

(52) U.S. Cl.
CPC ........ *G06F 16/9535* (2019.01); *G06F 40/197* (2020.01); *H04L 67/01* (2022.05); *H04L 67/02* (2013.01); *H04L 67/53* (2022.05)

(58) Field of Classification Search
USPC ........................................ 705/26.8, 26.1–27.2
See application file for complete search history.

(56) References Cited

U.S. PATENT DOCUMENTS

| | | | | |
|---|---|---|---|---|
| 2009/0299875 | A1* | 12/2009 | Zhu | G06Q 30/0601 |
| | | | | 705/26.1 |
| 2010/0174623 | A1* | 7/2010 | Mcphie | G06Q 30/00 |
| | | | | 705/347 |
| 2012/0047022 | A1* | 2/2012 | Shamim | G06Q 30/0269 |
| | | | | 705/14.66 |
| 2012/0191572 | A1* | 7/2012 | Mengerink | G06Q 30/0613 |
| | | | | 705/26.81 |
| 2012/0324375 | A1* | 12/2012 | Mathews | G06F 16/95 |
| | | | | 715/760 |

* cited by examiner

METHOD, SYSTEM, AND MEDIUM FOR AUTOMATIC DISPLAY OF PRODUCTS VIEWED ON DISTINCT WEB DOMAINS

CROSS-REFERENCE TO RELATED APPLICATION(S)

This application claims priority to, the benefit of, and is a continuation application of U.S. application Ser. No. 15/216,743, filed Jul. 22, 2016, which is a 371 of International Application No. PCT/US2015/012724, filed Jan. 23, 2016, and U.S. Provisional Application No. 61/931,542, filed Jan. 24, 2014, which are all hereby incorporated by reference herein in their entirety.

FIELD

This patent application generally relates to a system for automatically displaying products on distinct web domains. More particularly, it relates to a system that automatically allows a user to see relevant information from an unrelated web domain while viewing a different web domain. Even more particularly, it relates to a system that automatically allows a user to link to the information from the unrelated web domain while viewing the different web domain.

BACKGROUND

Users, such as customers for automobiles viewing cars on the internet, have had no way to easily compare cars sold by competing dealers. Nor have they had an automatic system for doing so. A better scheme is needed, and such solutions are provided by the following description.

SUMMARY

One aspect of the present patent application is a method of accumulating a personalized list of products viewed by a user on different website domains. The method includes providing a first embedded code on a first website domain and a second embedded code on a second website domain in which the first website domain is different from the second website domain. Each of the embedded codes allows a specified third party server to communicate interactively with the user. The method further includes automatically accumulating a personalized list of products viewed by the user in a database on the specified third party server, wherein the personalized list includes at least a first product and a second product, wherein the first product is on the first website domain and the second product is on the second website domain.

One embodiment further includes displaying the personalized list when the user views any one of a plurality of website domains, wherein the plurality of website domains includes the first website domain and the second website domain.

In one embodiment if the user selects the first product on the personalized list, the method includes displaying the first product on the first website domain and if the user selects the second product on the personalized list, displaying the second product on the second website domain.

In one embodiment when the user views the first website domain with a device running a browser, providing a cookie to the browser and storing the cookie ID on the third party server.

In one embodiment if the user views the first product on the first website domain, the method includes storing an identification of the first product in association with the cookie ID on the third party server.

One embodiment further includes identifying the cookie when the user views the second website domain, and providing information about the first product from the first website domain and stored by the third party server associated with the cookie ID for display to the user on the second website domain.

One embodiment further includes receiving user identification information from the user and storing the user identification information in association with the cookie.

In one embodiment the user identification information includes user contact information.

In one embodiment the user contact information includes at least one from the group consisting of an email address and a telephone number.

One embodiment further includes displaying the personalized list on a second display device if the user provides the same user identification information from the second display device.

One embodiment further includes the user identifying at least one favorite product, and storing a favorite product identifier on the third party server.

One embodiment further includes automatically providing an alert to the user related to the favorite product.

In one embodiment the alert includes at least one from the group consisting of a price change, a statement giving the number of other users watching the user's favorite product, a statement that another user has made an offer to buy the favorite product, and a statement that the favorite product has been sold.

In one embodiment the favorite product is a member of the personalized list.

In one embodiment the product is a motor vehicle.

Another aspect of the present patent application is a method of communicating about a product with a user. The method includes the user identifying a specific product on a website, wherein the product has an identifying code. The method also includes the user providing a method of contacting the user, and using the method of contact and automatically contacting the user with a change in information about the user's identified product.

In one embodiment the change of information includes at least one from the group consisting of a price change, a statement giving the number of other users watching the user's identified product, a statement that another user has made an offer to buy the identified product, and a statement that the identified product has been sold.

Another aspect of the present patent application is a method that includes automatically accumulating a personalized list of products in a common database, wherein the personalized list includes at least a first product and a second product, wherein the first product is displayed on a first website domain and the second product is displayed on a second website domain, wherein the first website domain is different from the second website domain, wherein a first product identifier is automatically accumulated in the common database when a user views the first product on the first website domain and wherein a second product identifier is automatically accumulated in the common database when a user views the second product on the second website domain.

One embodiment further includes displaying the personalized list when the user views any one of a plurality of website domains, wherein the plurality of website domains includes the first website domain and the second website domain.

In one embodiment if the user selects the first product on the personalized list, displaying the first product on the first website domain, and if the user selects the second product on the personalized list, displaying the second product on the second website domain.

BRIEF DESCRIPTION OF THE DRAWINGS

The foregoing will be apparent from the following detailed description, as illustrated in the accompanying drawings, in which:

FIG. 1 is a screen shot showing what a user sees when viewing a product on a first domain;

FIG. 2 is a screen shot showing products drat a user sees when visiting a second domain to continue shopping;

FIG. 6 is a screen shot showing the product saved on the first domain based on the cookie with a link to the database of FIG. 3;

FIG. 8 is a screen shot showing the results of the user creating an account that includes a desired method of contact, such as email that enables the user to save the product he or she is interested in;

FIG. 11 is a screen shot showing the result if an attribute of the product changes, such as price, and the system alerts the user via the user's chosen method of communication, and the user can view the alert on each domain, such as the first domain which is shown, and see links to products on both the first domain and on the second domain, such as in this case, seeing links to the Ford domain when the user is on the Toyota domain.

DETAILED DESCRIPTION

The present applicants created a system that automatically saves and displays as a hyperlinked list all of the competing products viewed by a user, although the products may be found on different website domains. The system also allows the user to select favorite ones among the viewed products for separate display to the user. The scheme also allows the user to receive alerts related to any of the products so selected if the user provides contact information.

Figure 1:
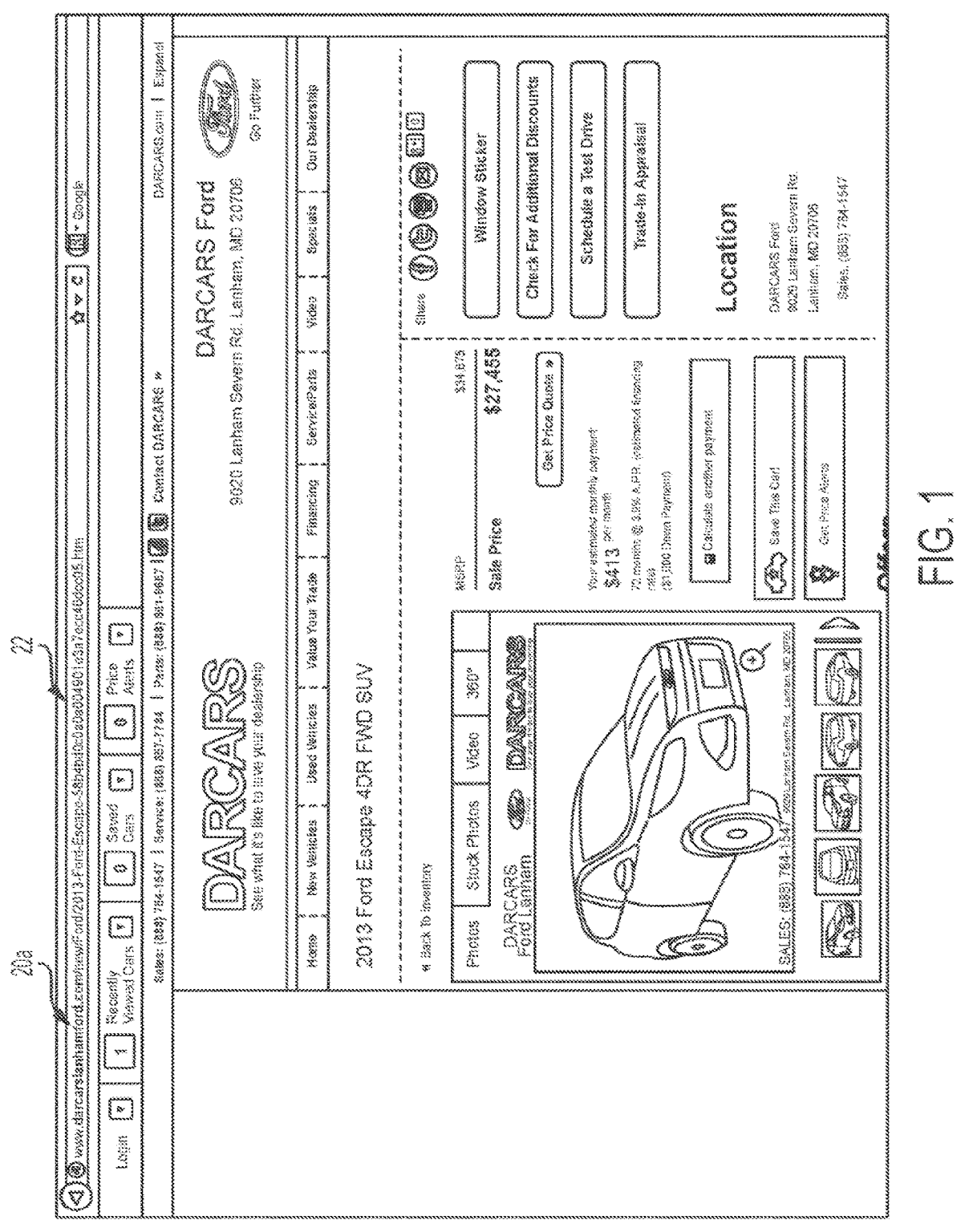

In one embodiment, illustrated in FIG. 1, a user may view one or more products, such as automobiles or other motor vehicles, on first website domain 20*a*, such as the website of a first automobile dealership, in this example DARCARS Ford. While automobiles are used for illustrative purposes in this patent application, the subject of the viewing can be any kind of product.

Each automobile on the dealership lot may be displayed on its own page or pages on the automobile dealers website. The first page on that website may include a photograph and text with description of the automobile's features, manufacturers suggested retail price, sale price, financing information, and location, as also shown in FIG. 1. It can include links to additional photographs, a video, and additional information about the vehicle. It can also include links to schedule an appointment to see or test drive the vehicle. Each page of the website for a particular vehicle has its own unique URL 22 that includes website-domain 20*a*.

Figure 2:
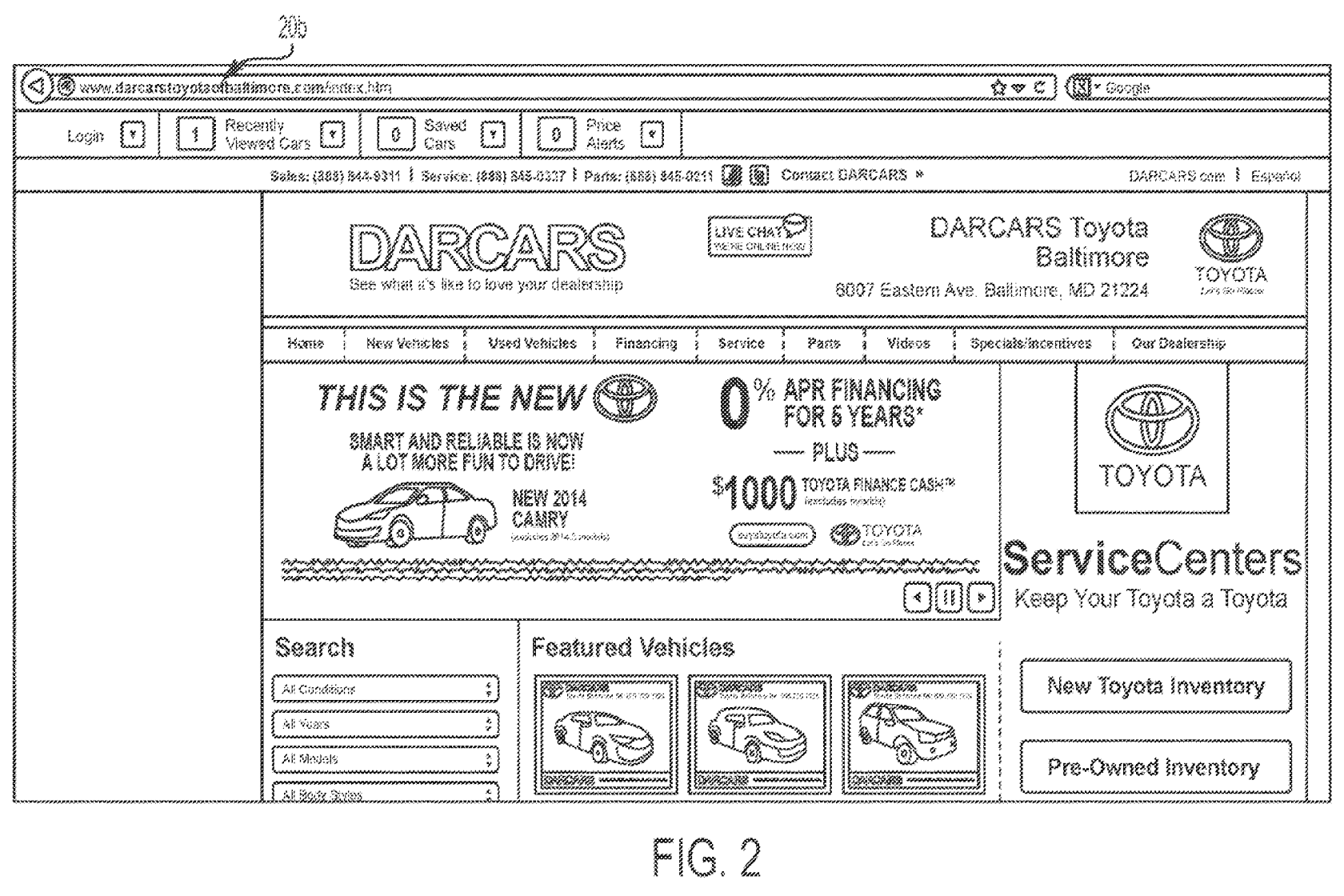

After viewing one or more automobiles on a page or on pages of the first automobile dealer's website the user may then choose to leave that dealer's website to view automobiles on another dealer's website, such as DARCARS Toyota, as shown in FIG. 2. The second dealer's website may have a second website domain 20*b* which is not directly connected with the first dealer's website domain.

Figure 3:
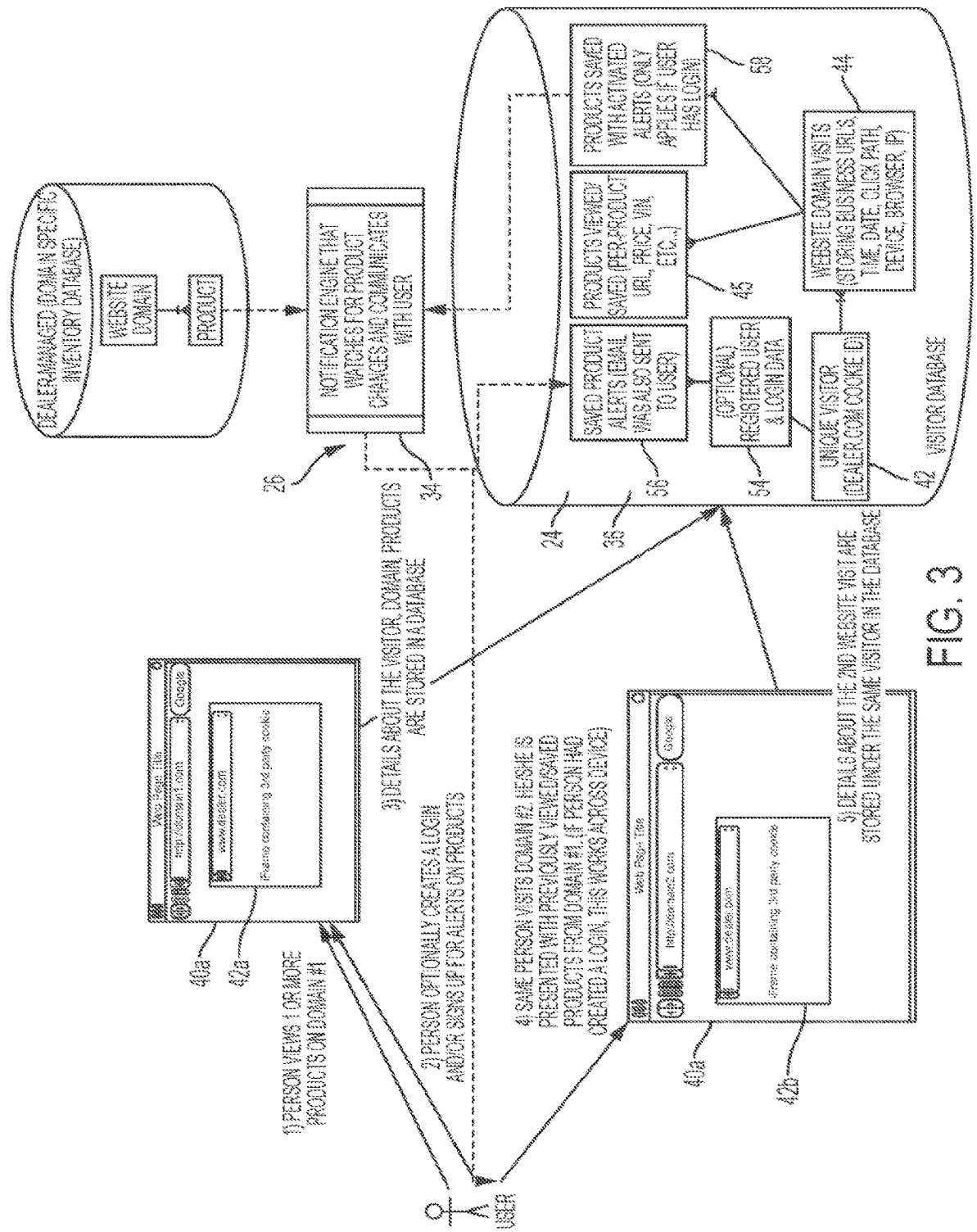
FIG. 3 is a flow chart showing the visitor database that stores information such as details about the visitor, the domains visited, the products viewed, and the products saved, and that communicates with a dealer-managed database and with a notification engine that communicates information to the user.

In one embodiment, the system automatically stores identifying information about the user's device and about the products the user viewed in database 24, as shown in the block diagram in FIG. 3. The user's device (not shown) may be a display device, such as a computer, a smart phone, or a tablet. In one embodiment, the identifying information about the user are those that can be detected by a server hosting the automobile dealer's website, including the user's IP address, operating system, and the user's browser.

In another embodiment, when the user connects with the dealer's website, server 26 hosting that website automatically sends a cookie for storage in the user's browser on the user's device. The cookie includes a cookie identifying number that uniquely identifies the user's device. Anytime in the future (until the user clears the cookies) that the user uses that device to reconnect with the dealer's website, server 26 will recognize the cookie ID and can access information previously collected related to that cookie that was stored in database 24.

The collected and saved information may include the user's device type, the user's browser, the user's IP address, and the user's click path on the dealer's website. The click path includes the URLs of all the pages on the website that were viewed by the user and the date and time of the user's visit to each of those pages. From the URL, additional information can be stored in the database, including the automobile viewed, the price at the time that automobile was viewed, the vehicle's identification number (VIN), and other information about the vehicle.

Figure 4:
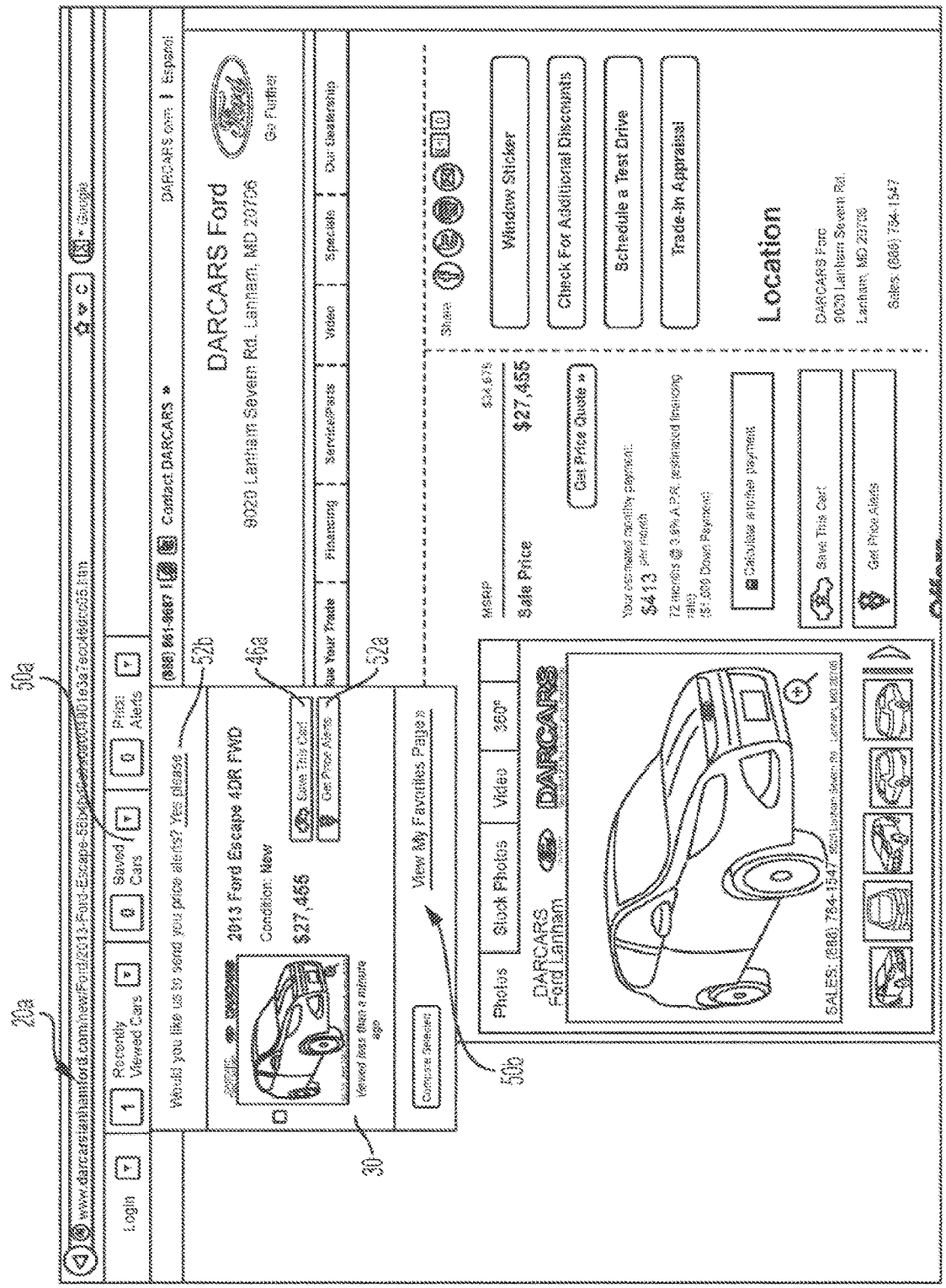
FIG. 4 is a screen shot showing what a user sees when viewing a product on a first domain that was recently viewed, based on a cookie.

Thus, the system can display list 30 of the automobiles viewed by the user at a particular dealer's website, as shown in FIG. 4. In this example only one vehicle has been viewed by the user so far so list 30 only includes one member. In the embodiment shown, when the user clicks a tab marked "Recently Viewed Cars," list 30 appears overlayed on Whatever web page the user is currently viewing.

The present application also includes a way to automatically save and display as a hyperlinked list all of the competing products viewed by the user, although the products may be found on the 110 different website domains of different automobile dealerships.

In one embodiment, each of the different automobile dealerships permits a third party provider, such as Dealer Dot Corn, Inc., to provide embedded code, such as an iFrame, on its website that is accessible from server 26 provided by the third party provider, as shown in FIG. 3. The iFrame, or other embedded code, allows third-party server 26 to provide web content, such as text and images, within the dealership's web pages and to receive information, such as the IP address of a user or an email address provided by a user on the dealership's website. Information about the user's interaction with the website, including the click path, the sequence of URLs and products viewed by the user can also be transmitted to the third party server. The content within an iFrame can be changed by third-party server 26 without the user having to reload the surrounding page the user is viewing. Server 26 includes processor 34 and storage 36 for database 24. While the example given here includes only two dealerships, the same method is used with any other number of dealerships that have made themselves in-network with the third party provider to receive the iFrame on their web sites that are accessible from server 26 provided by the third party provider.

Figure 5:
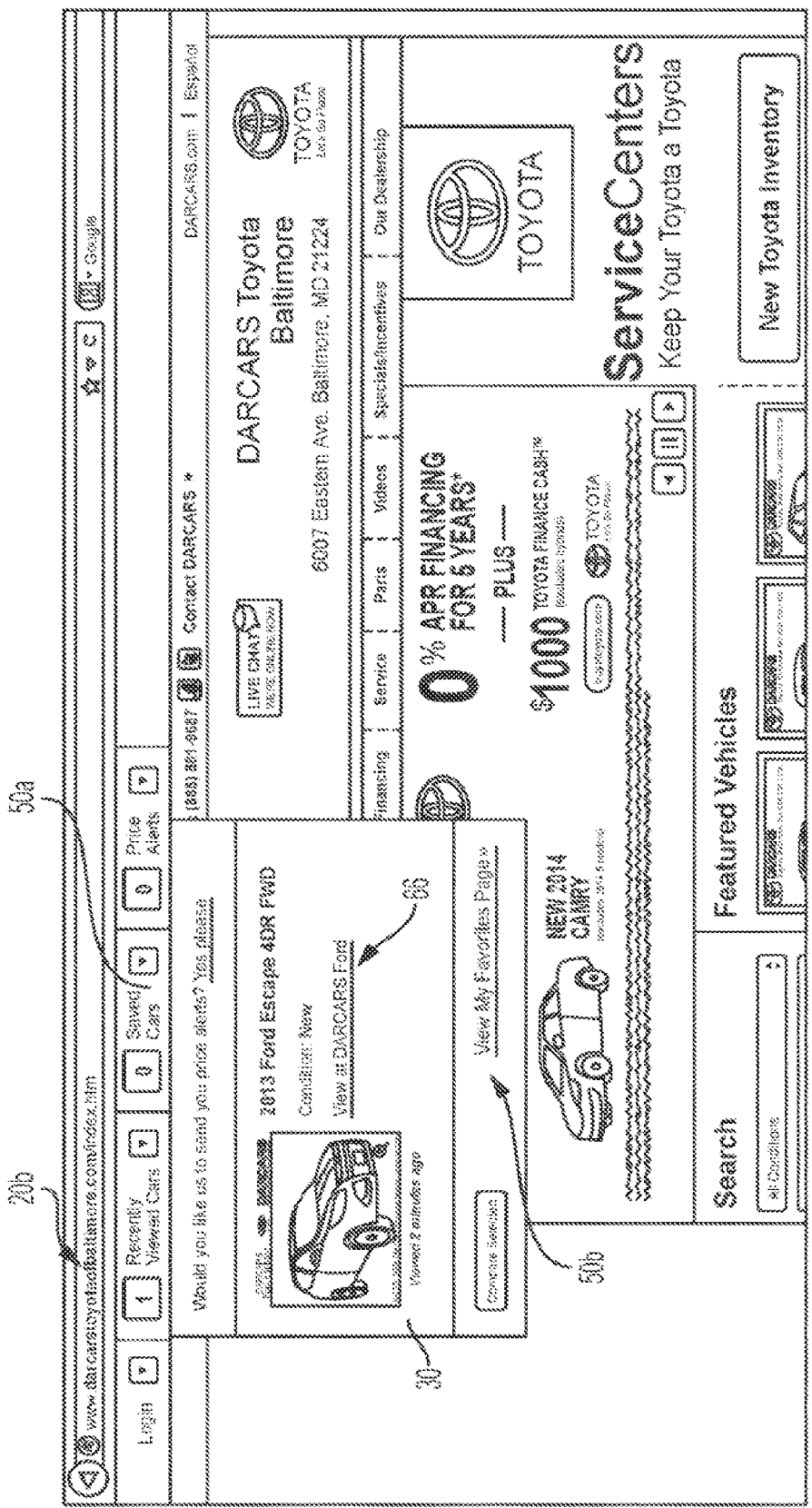
FIG. 5 is a screen shot showing that the user sees an online representation of the product ("the product") from the first domain visible on the second domain with a link back to the first domain for a product that exists on the first domain while at least a portion of the information about the product exists on the database of FIG. 3.

When the user accesses web site 40a of a first one of the dealerships, the cookie is provided to the user from server 26 through iFrame 42a, and the cookie ID is stored on the user's browser. The cookie ID is also stored in database 24 on server 26 provided by the third party provider, as shown in box 42 in database 24 of FIG. 3. Now, when the user accesses the web site of a second one of the dealerships, through iFrame 42b on its website 40b, the user's browser presents that cookie to server 26 through iFrame 42b. No further cookie is provided. The third party server uses the existing cookie for identifying the user regardless of which dealership website domain 40a, 40b the user visits, as shown in box 44 in database 24. The system allows third-party server 26 to collect and save the user's click path on all the different third-party-associated dealers' web sites 40a, 40b that the user visits, as shown in box 45 in database 24. Thus, the list of one or more automobiles viewed on website domain 20a of the first dealership, DARCARS Ford, shown in FIG. 4, is also visible on website domain 20b of the second dealership, DARCARS Toyota, as shown in FIG. 5.

Figure 6:
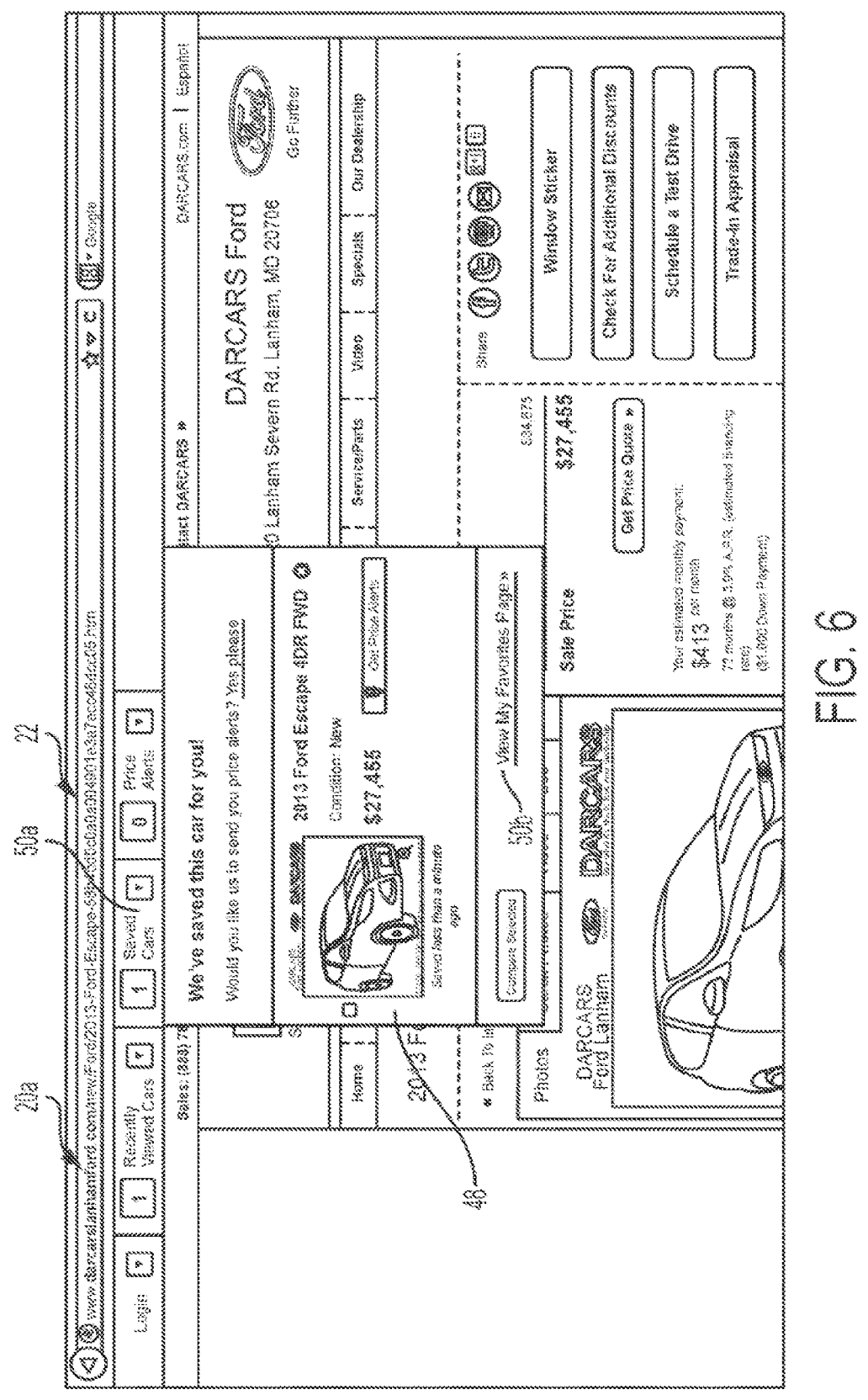
Figure 7:
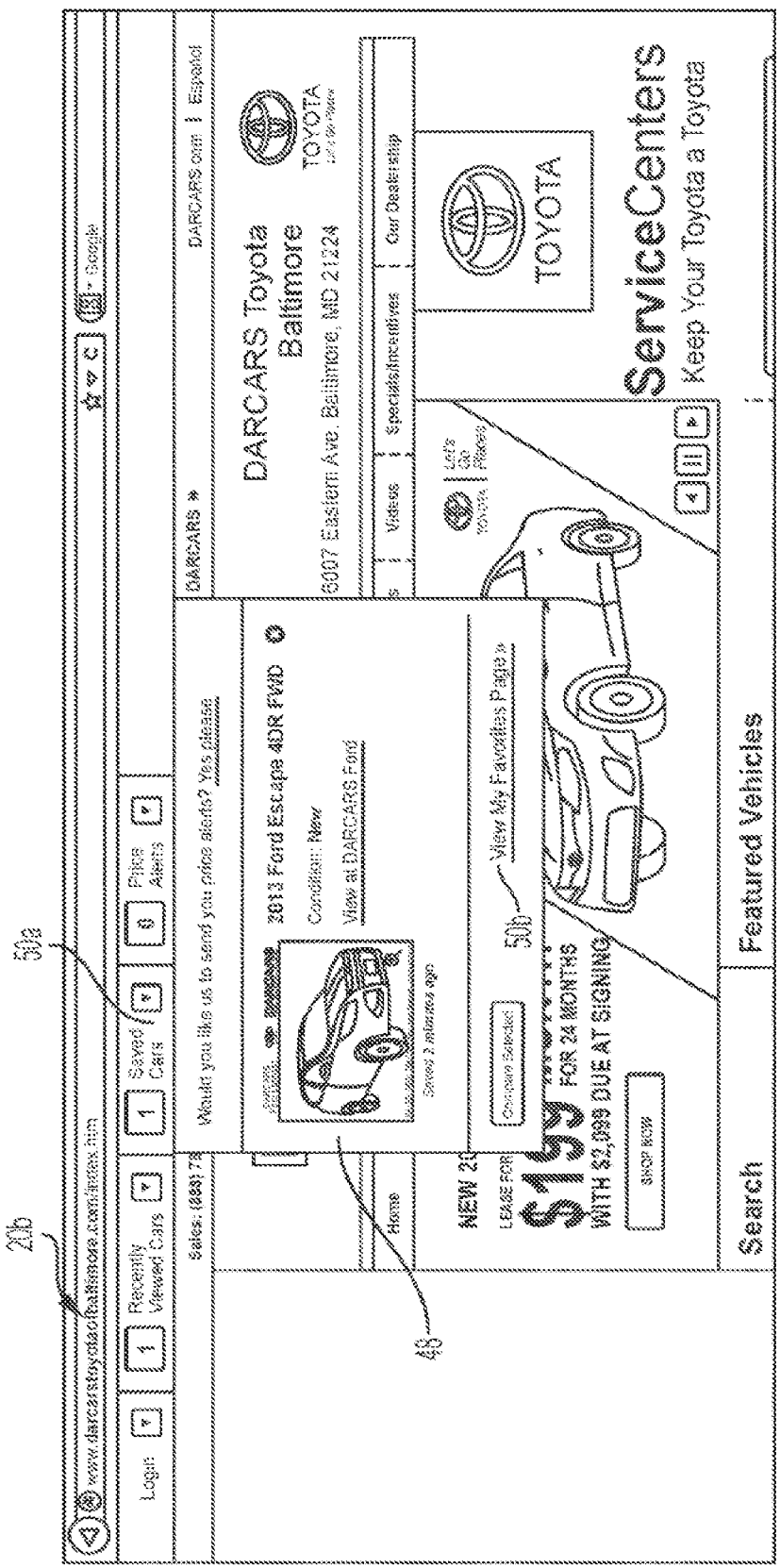
FIG. 7 is a screen shot showing the second domain with the product from the first domain visible as saved by the user when viewing the product on the first domain and the product is visible on the second domain, still based on the cookie with a link to the database of FIG. 3.

In one embodiment, list of viewed automobiles 30 includes for each member of the list "save this car" tab 46, allowing the user to identify the car as a potential favorite in "saved car" list 48. "Saved car" list 48 can be accessed by clicking on tab 50a, 50b, as shown in FIG. 6. As with list of recently viewed cars 30, the list of one or more automobiles saved on website domain 20a of the first dealership, DARCARS Ford, shown in FIG. 6, is also visible on website domain 20b of the second dealership, DARCARS Toyota, as shown in FIG. 7.

In one embodiment, list of viewed vehicles 30 also includes for each member of the list "get price alerts" tab 52a, 52b, as shown in FIG. 4, which allows the user to request receipt of alerts about a viewed automobile. Alerts may include a price increase, a price decrease, a change in incentives, or other new information about the vehicle that the user selected for receiving alerts.

If the user has not already provided contact information, when the user clicks on "get price alerts" tab 52a, 52b the system takes the user to a page (not shown) where the user can provide contact information, such as an email address or a phone number so the user can automatically receive the alerts by email or by text message. In one embodiment, the system automatically notifies the user that the registration with the email address has been successful after the user provides this contact information, as shown in FIG. 8.

Figure 8:
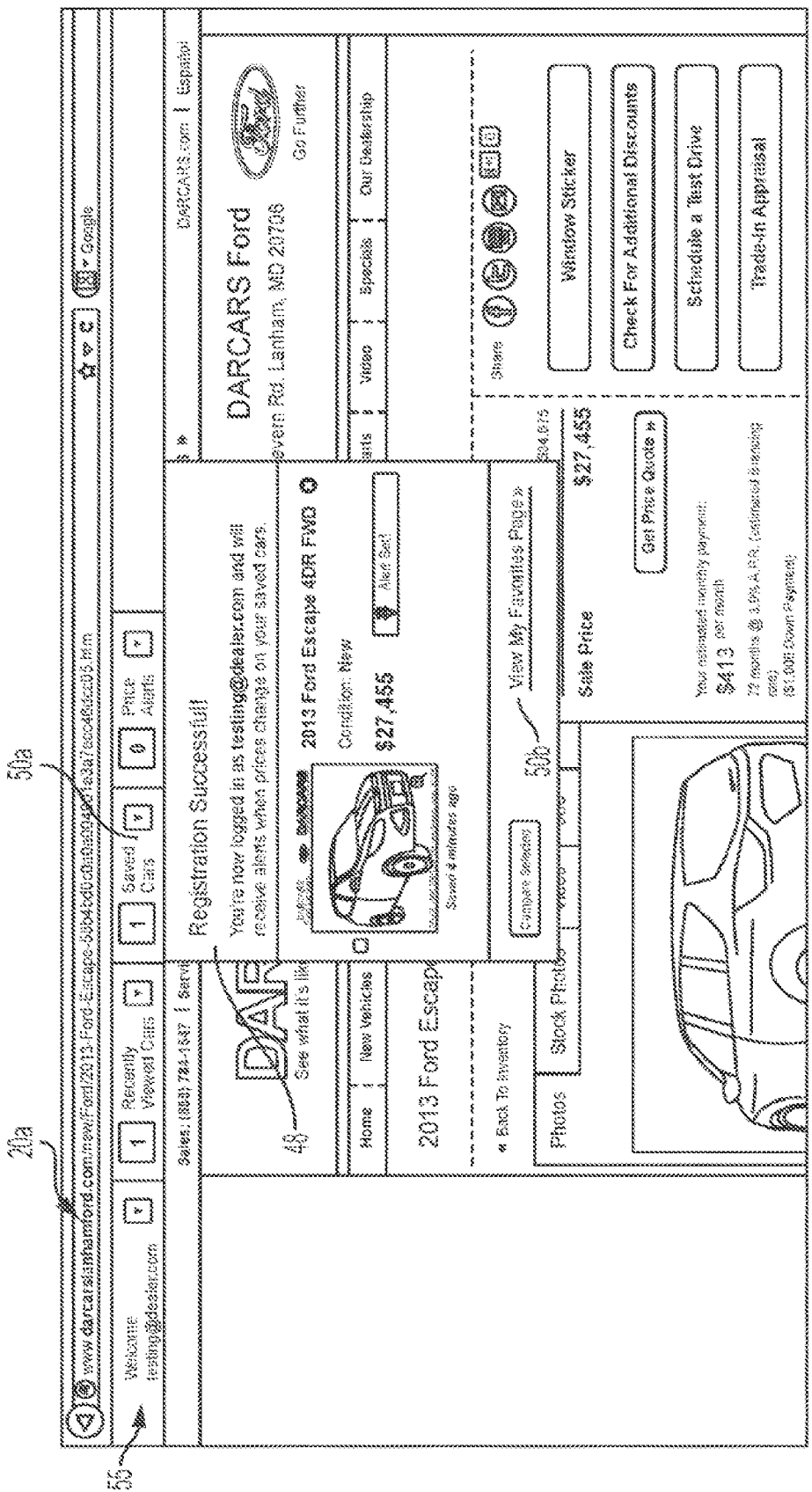
Figure 9:
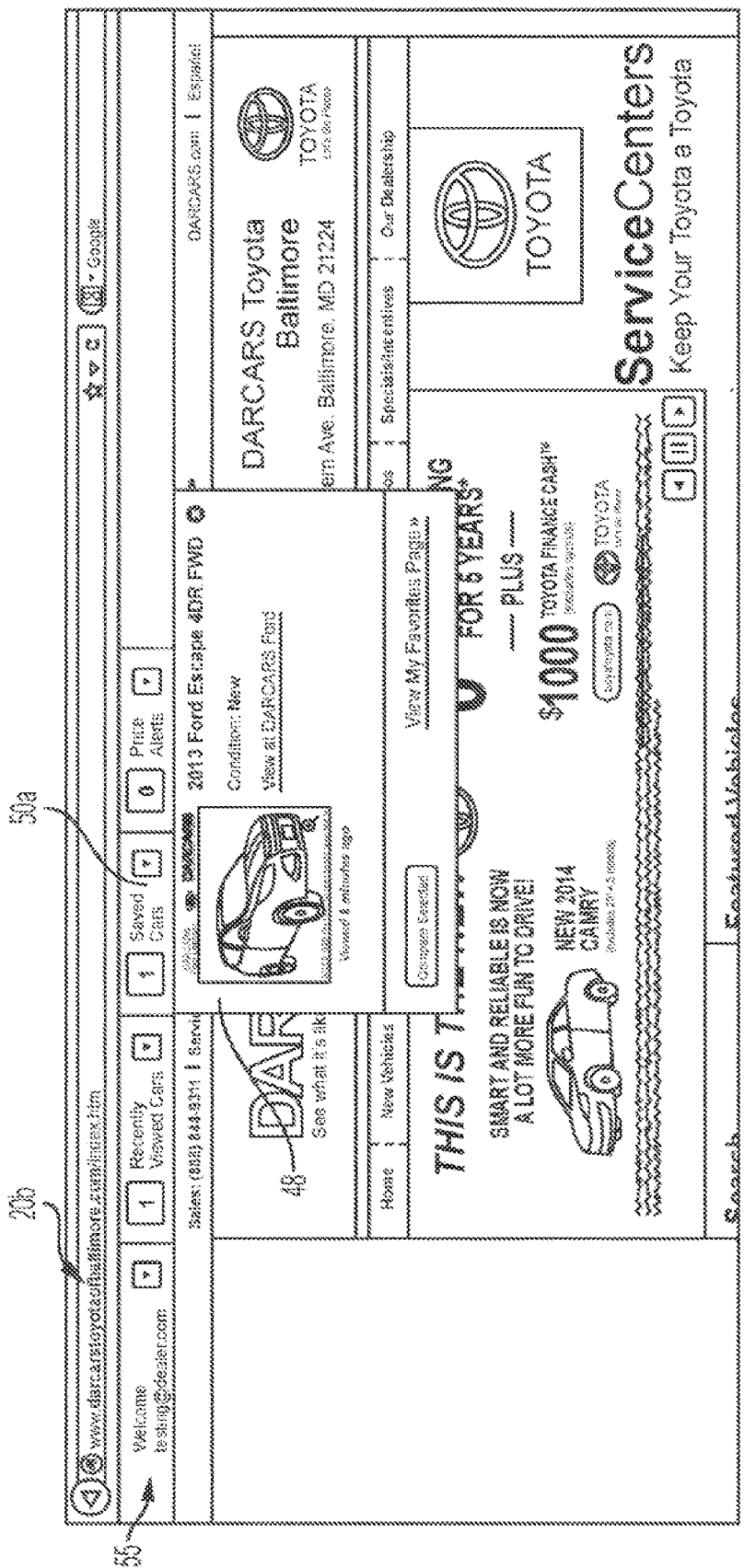
FIG. 9 is a screen shot showing the user logged in automatically when he or she visits the second domain, and the product from the first domain is remaining visible on the second domain.

If the user signed up for alerts by clicking on the "save" button and providing contact information, such as an email address, when the user was on the first website domain, as shown in box 58 of FIG. 3, that contact information is stored in third party server's database 24, as shown in box 54, and remains available to server 26 when the user leaves the first website domain and visits the second website domain, as shown in tab 55 in FIGS. 8 and 9, "welcome testing@dealer.com".

Figure 10:
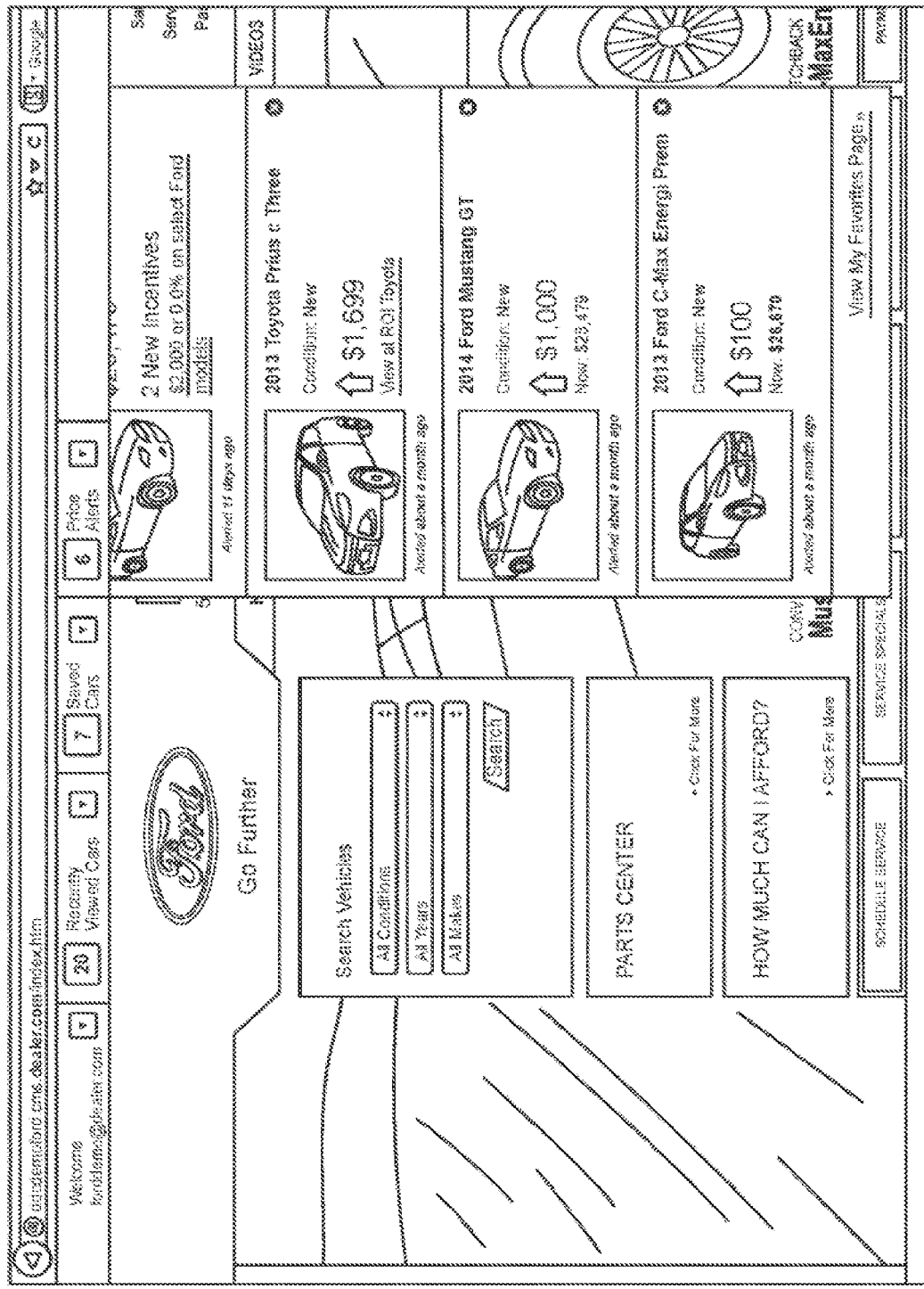
FIG. 10 is a screen shot showing the result if an attribute of the product changes, such as price, and system alerts the user via the user's chosen method of communication, and the user can view the alert on each domain, such as the second domain which is shown, and see links to products on both the second domain and on the first domain, such as in this case, seeing links to the Toyota domain when the user is on the Ford domain.
Figure 11:
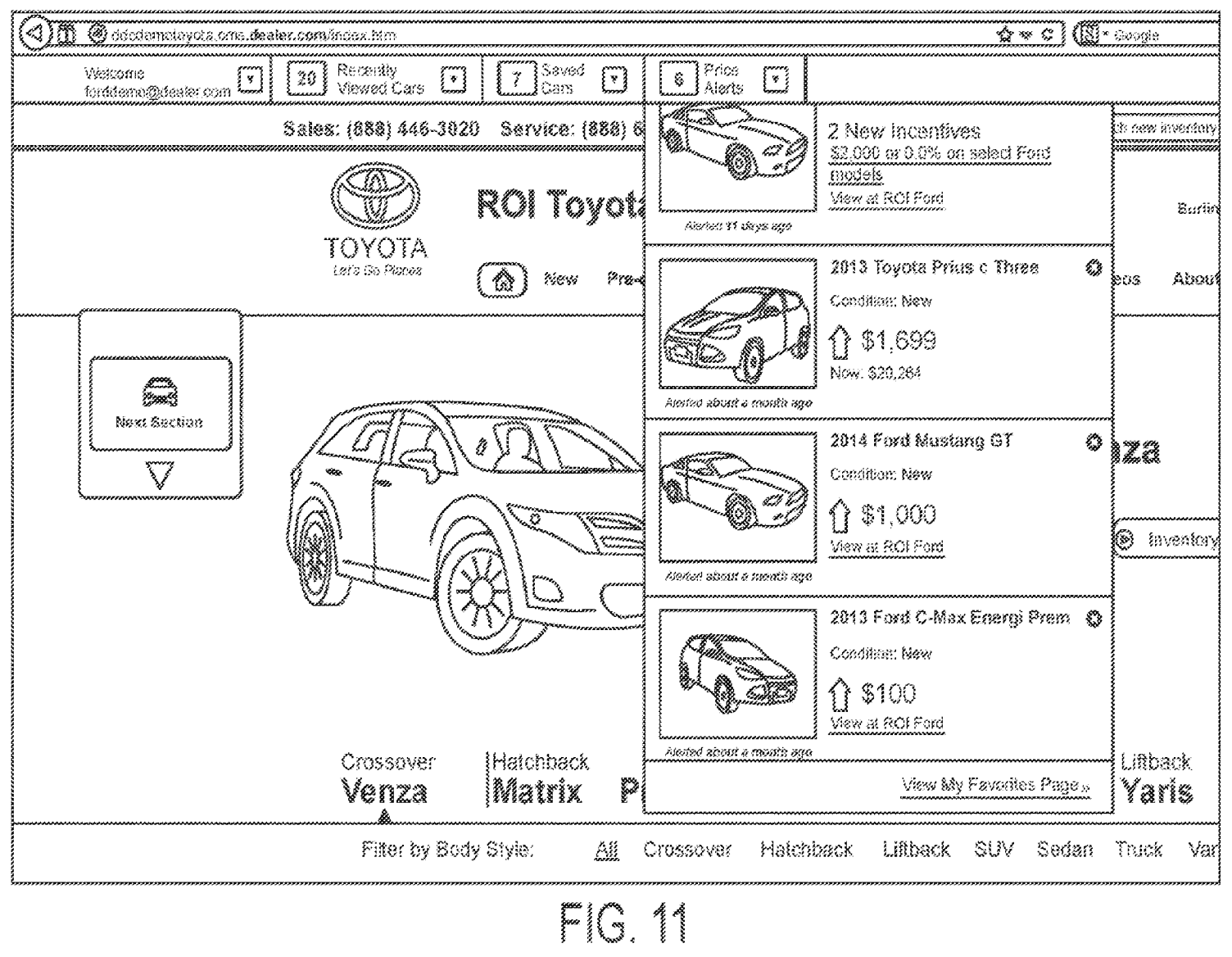

Thus, in addition to providing the alerts by email or text, as shown in box 56 of FIG. 3, server 26 displays the alerts, such as price changes, in the price alerts list that originates with either of the dealerships and that are available for viewing on both the first and second website domains, as shown in FIGS. 10 and 11.

In one embodiment, the system asks the user to provide the contact information when the user requests to add a first car to "saved car" list 48. In one embodiment, price alerts are automatically sent to the user for all the cars designated as favorites and listed as saved cars in saved car list 48.

In one embodiment, the system allows the user to see the full list of vehicles that the user identified as favorites by clicking on "saved cars" tab 50a, 50b. The system allows the user to add or delete cars from the saved car list.

In one embodiment, the "save this car" and "get price alerts" buttons are omitted from the personalized list when the listing of the car is viewed on the website of a competing dealership, as shown in FIG. 5, whereas these buttons are visible when the personalized list is viewed on the products original domain, as shown in FIG. 4. However, if the user clicks on a listing of a car on the website domain of the first dealership while on the website domain of the second dealership or clicks on link 66 to view that car on its native website domain, the system takes the user back to the page of website domain 20a, 40a of the first dealership where all the information about that car is displayed. On the listing of recently viewed cars on that page the "save this car" and "get price alerts" tabs are available for that car.

Figure 12:
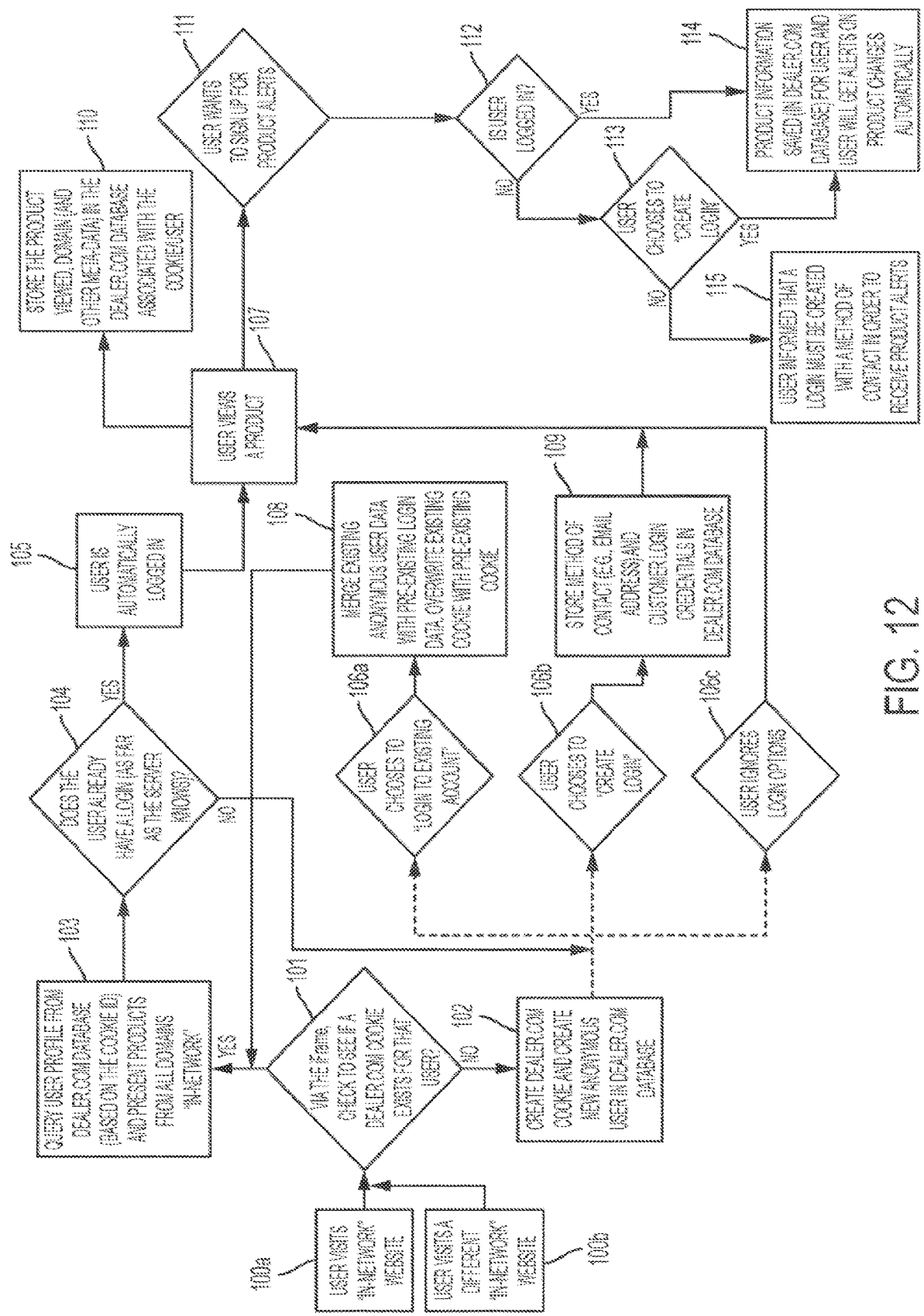
FIG. 12 is a flow chart showing the steps followed by a program running on a computer to accomplish the tasks in FIGS. 1-11.

The steps followed by processor 34 of third-party server 26 are illustrated in the flow chart in FIG. 12. When a user visits a website domain that is in the network of website domains served by a third party provider, such as Dealer Dot Coin, Inc., as shown in box 100a, 100b, the user's browser makes any existing dealer.com cookie available to dealer.com iFrame 42a embedded in the dealership's website, and processor 34 verifies through iFrame 42a that a Dealer Dot Com, Inc. cookie ID has been saved in data base 24 for that user, as shown in query box 101. If no Dealer Dot Com, Inc. cookie exists for that user, then processor 34 creates a Dealer Dot Com, Inc. cookie for that user and stores the new anonymous user ID for that cookie in database 24, as shown in box 102.

If a Dealer Dot Com, Inc. cookie exists for that user, then processor 34 queries database 24 based on the cookie ID. Since a common cookie ID has been used by the system across all in-network website domains, the processor can now present a list of products viewed by the user on all the in-network website domains, as shown in box 103. However, it is possible that the user previously used a different browser or a different device. In this case, processor 34 will have assigned a different cookie, and the previous record will not be identified.

Processor 34 then checks data base 24 to see whether, based on the cookie ID, the user has already provided an email address, as shown in query box 104. If so, processor 34 automatically logs the user in, as shown in box 105. However, it is possible that the user previously provided an email address using a different browser or using a different device. In this case, processor 34 will have assigned a different cookie, and the previous record, including the email address, will not be identified, and the user will not be logged in.

If processor 34 does not find a login for the user, then processor 34 offers the user three choices as shown in query boxes 106a, 106b, 106c. The user can log into an existing account by providing the previously submitted contact information, such as an email address, as shown in box 106a. Alternatively, the user can choose to create a login by providing contact information for the first time, as shown in box 106b. Alternatively, the user can choose to ignore the other login options, as shown in box 106c and go right to viewing a product, such as an automobile on the dealer's in-network website, as shown in box 107.

If the user logs into an existing account, as shown in box 106a, say from a session using a different browser or a different device, processor 34 merges any data regarding products viewed and saved from the present anonymous user session, if any, with data from the previous session. Processor 34 also overwrites the existing cookie with the pre-existing cookie from the previous session with the different browser or device, as shown in box 108. The user then views a product, as shown in box 107.

If the user chooses to create a login, and enters contact information, such as an email address, as shown in box 106b, processor 34 stores the email address and the customers' login credentials in database 24, as shown in box 109. Login credentials may include the email address and a password.

The user then views a product, as shown in box 107.

While the user is viewing a product, as shown in box 107, processor 32 automatically stores an identifier of the product viewed, such as the URL, in database 24 in association with the cookie of the user, as shown in box 110.

The user may select signing up for product alerts for one or more of the products the user has seen, as shown in box 111. If the user is logged in, as shown in query box 112, or logs into an existing login, or chooses to create a login, as shown in query box 113, the selected product information is saved in database 24 in association with the user's contact information, and the user will get alerts on product changes automatically, regardless of which in-network website domain from which they 110 arise, as shown in box 114. If the user chooses not to create a log in, or chooses not to log in, then processor 34 informs the user that a login must be created with a method of contact in order for the user to receive product alerts, as shown in box 115.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A method comprising:
receiving, from a first online merchant website of a first online merchant and by a server, a first selection on the first online merchant website of a first product listed on the first online merchant website;
receiving, based on the first selection and by the server, a cookie including a cookie identifier, wherein an identification of the first product is stored in association with the cookie identifier in a database on the server;
receiving, from a second online merchant website of a second online merchant and by the server, a second selection on the second online merchant website of a second product listed on the second online merchant website,
wherein the server is associated with a third party that is different than the first online merchant and the second online merchant,
wherein the first online merchant website is different from the second online merchant website,
wherein the first online merchant website includes a first embedded code comprising a first window and the second online merchant website includes a second embedded code comprising a second window,
wherein the first embedded code and the second embedded code allow the server to communicate with the first online merchant website and the second online merchant website,
wherein the first selection is made on a first portion of the first online merchant website that is separate from the first embedded code and the second selection is made on a second portion of the second online merchant website that is separate from the second embedded code;
determining that a user is viewing the second online merchant website;
receiving, based on the determination that the user is viewing the second online merchant website and from the server, an indication identifying the cookie;
automatically accumulating, by the server, a personalized list of products viewable through the first embedded code on the first online merchant website and the second embedded code on the second online merchant website, wherein the personalized list includes the first product and the second product;
sending, by the server, to the second embedded code, and based on receiving the indication identifying the cookie, an indication to display the first product from the first online merchant website on the second online merchant website through the second window;
determining a change associated with the first product or the second product on the first online merchant website or the second online merchant website, wherein the change includes at least one of: a price change or an indication that the first product or the second product was sold;
sending, based on determining the change, an indication of an alert to the first embedded code and the second embedded code for presentation on the first online merchant website and second online merchant website; and
presenting the indication of the alert within the first embedded code and the second embedded code on the first online merchant website and second online merchant website.

2. The method of claim 1, wherein the first embedded code is displayed on the first online merchant website based on a determination that a selection of a viewed products button on the first online merchant website has been performed.

3. The method of claim 1, further comprising:
receiving a selection of the first product on the personalized list through the second online merchant website; and
sending, based on receiving the selection of the first product on the personalized list through the second online merchant website, an indication to display the first online merchant website.

4. The method of claim 1, further comprising:
receiving identification information associated with a user; and
storing the identification information in association with the cookie.

5. The method of claim 1, wherein the first product includes a hyperlink to the first online merchant website and wherein the second product includes a hyperlink to the second online merchant web site.

6. The method of claim 1, further comprising:
presenting, within the first embedded code and prior to the first product being selected, information about the first product that is also being presented on the first online merchant website;
receiving an indication of a user interaction with the information being presented within the first embedded code; and
presenting the first product through the second embedded code based on the user interaction with the information being presented within the first embedded code.

7. A system comprising:
a processor; and
a memory storing computer-executable instructions, that when executed by the processor, cause the processor to:
receive, from a first online merchant website of a first online merchant and by a server, a first selection on the first online merchant website of a first product listed on the first online merchant website;
receive, based on the first selection and by the server, a cookie including a cookie identifier, wherein an identification of the first product is stored in association with the cookie identifier in a database on the server;
receive, from a second online merchant website of a second online merchant and by the server, a second selection on the second online merchant website of a second product listed on the second online merchant website,
wherein the server is associated with a third party that is different than the first online merchant and the second online merchant,
wherein the first online merchant website is different from the second online merchant website,
wherein the first online merchant website includes a first embedded code comprising a first window and the second online merchant web site includes a second embedded code comprising a second window,
wherein the first embedded code and the second embedded code allow the server to communicate with the first online merchant website and the second online merchant website,
wherein the first selection is made on a first portion of the first online merchant website that is separate from the first embedded code and the second selection is made on a second portion of the second online merchant website that is separate from the second embedded code;

determine that a user is viewing the second online merchant website;
receive, based on the determination that the user is viewing the second online merchant website and from the server, an indication identifying the cookie;
automatically accumulate, by the server, a personalized list of products viewable through the first embedded code on the first online merchant website and the second embedded code on the second online merchant website, wherein the personalized list includes the first product and the second product;
send, by the server, to the second embedded code, and based on receiving the indication identifying the cookie, an indication to display the first product from the first online merchant website on the second online merchant website through the second window;
determine a change associated with the first product or the second product on the first online merchant website or the second online merchant website, wherein the change includes at least one of: a price change or an indication that the first product or the second product was sold;
send, based on determining the change, an indication of an alert to the first embedded code and the second embedded code for presentation on the first online merchant website and second online merchant website; and
present the indication of the alert within the first embedded code and the second embedded code on the first online merchant website and second online merchant website.

8. The system of claim 7, wherein the first embedded code further comprises a first window embedded in the first online merchant website, wherein the second embedded code further comprises a second window embedded in the second online merchant website, wherein the first window and second window both present the personalized list.

9. The system of claim 7, further comprising, wherein the first embedded code is displayed on the first online merchant website based on a determination that a selection of a viewed products button on the first online merchant website has been performed.

10. The system of claim 7, wherein the computer-executable instructions further cause the processor to:
receive a selection of the first product on the personalized list through the second online merchant website; and
send, based on receiving the selection of the first product on the personalized list through the second online merchant website, an indication to display the first product on the first online merchant website.

11. The system of claim 7, wherein an identification of the first product is stored in association with the cookie identifier in a database on the server.

12. The system of claim 7, wherein the computer-executable instructions further cause the processor to:
receive identification information associated with a user; and
store the identification information in association with the cookie.

13. A non-transitory computer-readable medium storing computer-executable instructions, that when executed by a processor, cause the processor to perform operations of:
receiving, from a first online merchant website of a first online merchant and by a server, a first selection on the first online merchant website of a first product listed on the first online merchant website;

receiving, based on the first selection and by the server, a cookie including a cookie identifier, wherein an identification of the first product is stored in association with the cookie identifier in a database on the server;

receiving, from a second online merchant website of a second online merchant and by the server, a second selection on the second online merchant website of a second product listed on the second online merchant website, wherein the server is associated with a third party that is different than the first online merchant and the second online merchant, wherein the first online merchant website is different from the second online merchant website, wherein the first online merchant website includes a first embedded code comprising a first window and the second online merchant web site includes a second embedded code comprising a second window, wherein the first embedded code and the second embedded code allow the server to communicate with the first online merchant website and the second online merchant website, wherein the first selection is made on a first portion of the first online merchant website that is separate from the first embedded code and the second selection is made on a second portion of the second online merchant website that is separate from the second embedded code;

determining that a user is viewing the second online merchant website;

receiving, based on the determination that the user is viewing the second online merchant website and from the server, an indication identifying the cookie;

automatically accumulating, by the server, a personalized list of products viewable through the first embedded code on the first online merchant website and the second embedded code on the second online merchant website, wherein the personalized list includes the first product and the second product;

sending, by the server, to the second embedded code, and based on receiving the indication identifying the cookie, an indication to display the first product from the first online merchant website on the second online merchant website through the second window;

determining a change associated with the first product or the second product on the first online merchant website or the second online merchant website, wherein the change includes at least one of: a price change or an indication that the first product or the second product was sold;

sending, based on determining the change, an indication of an alert to the first embedded code and the second embedded code for presentation on the first online merchant website and second online merchant website; and presenting the indication of the alert within the first embedded code and the second embedded code on the first online merchant website and second online merchant website.

* * * * *